United States Patent [19]
Shaughnessy

[11] Patent Number: 6,026,235
[45] Date of Patent: Feb. 15, 2000

[54] SYSTEM AND METHODS FOR MONITORING FUNCTIONS IN NATIVELY COMPILED SOFTWARE PROGRAMS

[75] Inventor: Steven T. Shaughnessy, Scotts Valley, Calif.

[73] Assignee: Inprise Corporation, Scotts Valley, Calif.

[21] Appl. No.: 08/858,612

[22] Filed: May 20, 1997

[51] Int. Cl.$^7$ ...................................................... G06F 9/45
[52] U.S. Cl. .......................................................... 395/704
[58] Field of Search .................................... 395/705, 703, 395/701, 709, 500, 704

[56] References Cited

U.S. PATENT DOCUMENTS

| | | | |
|---|---|---|---|
| 5,313,616 | 5/1994 | Cline ........................................ | 395/500 |
| 5,446,900 | 8/1995 | Kimelman ............................... | 395/700 |
| 5,528,753 | 6/1996 | Fortin .................................. | 395/183.11 |
| 5,535,391 | 7/1996 | Hejlsberg ................................ | 395/700 |
| 5,579,520 | 11/1996 | Bennett .................................... | 395/704 |

OTHER PUBLICATIONS

John M. Dlugosz, DOS Profilers, Computer Language, Oct. 1989, pp. 81,82,84,–87.

Paul Yao, Tuning the Performance of Windows and OS/2 Programs With MicroQuill's Segmentor, Microsoft Systems Journal (electronic copy), Mar. 1991, vol.6, p. 49(7).

Paul M. Sherer, New Tools Automates Segmenting Process. (MicroQuill Inc.'s Segmentor Programming Tool) (Product Announcement), PC Week (electronic copy), Jan. 21, 1991, vol. 8, p. 53(1).

Ralph G. Brickner, Execution Profilers for the PC: Part 2 (Software Review) (Commercial Software Profilers), PC Tech Journal (electronic copy), Feb. 1987, vol. 5, p. 166(6).

Keith W. Boone, A Source Code Profiler, Dr. Dobb's Journal, Oct. 1992, pp. 98,100,102,104,128,130–131.

*Primary Examiner*—Tariq R. Hafiz
*Assistant Examiner*—Wei Zhen
*Attorney, Agent, or Firm*—John A. Smart

[57] ABSTRACT

A development system having a monitor/profiler tool for monitoring functions in natively compiled software programs is described. According to the present invention, the monitor/profiler tool is constructed to work directly on a natively compiled software application which only have debugging info. Unlike prior approaches, the monitor/profiler tool does not require a special compile or link phase for the application under exam. The tool can monitor any function in software application which has debug info, thus relieving program developers from the burden of maintaining two ways of building an application. The developer can simply use the same executable for both development and function analysis.

12 Claims, 6 Drawing Sheets

SYSTEM AND METHODS FOR MONITORING FUNCTIONS IN NATIVELY COMPILED SOFTWARE PROGRAMS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of development systems for computers and, more particularly, to systems and methods for profiling software programs executable by computers.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. Most of the high-level languages currently used for program development exploit the concept of modularity whereby a commonly required set of operations can be encapsulated in a separately named subroutine, procedure, or function; these terms will be used interchangeably herein to represent any type of discrete code objects. Once coded, such subroutines can be reused by "calling" them from any point in the main program. Further, a subroutine may call a subsubroutine, and so on, so that in most cases an executing program is seldom a linear sequence of instructions.

In the C language, for example, a main( ) program is written which calls a sequence of functions, each of which can call functions, and so on. The essence of a function call is that the calling function (caller) passes relevant data as arguments (or parameters) to the target function (callee), transfers control to the memory section holding the function's executable code, returns the result of the call, and at the same time, stores sufficient information to ensure that subsequent execution resumes immediately after the point where the original function call was made. This approach allows developers to express procedural instructions in a style of writing which is easily read and understood by fellow programmers.

A program called a "compiler" translates these instructions into the requisite machine language. In the context of this translation, the program written in the high-level language is called the "source code" or source program. The ultimate output of the compiler is an "object module," which includes instructions for execution by a target processor. Although an object module includes code for instructing the operation of a computer, the object module itself is not in a form which may be directly executed by a computer. Instead, it must undergo a "linking" operation before the final executable program is created.

Linking may be thought of as the general process of combining or linking together one or more compiled object modules to create an executable program. This task usually falls to a program called a "linker." In typical operation, a linker receives, either from the user or from an integrated compiler, a list of object modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .EXE file) which, after testing and quality assurance, is passed to the user with appropriate installation and usage instructions.

Ideally, when a compiler/linker development system translates a description of a program and maps it onto the underlying machine-level instruction set of a target processor, the resulting code should be at least as good as can be written by hand. In reality, code created by straightforward compilation and linking rarely achieves its goal. Instead, tradeoffs of slower performance and/or increased size of the executing application are often incurred. Thus while development systems simplify the task of creating meaningful programs, they rarely produce machine code which is not only the most efficient (smallest) in size but also executes the fastest.

One approach for improving the machine-level code generated for a program is to employ an execution "profiler" for analyzing the code, including looking at program performance for detecting any significant performance bottlenecks. Other analyses include detecting invalid API (Application Programming Interface) usage and memory leaks, as well as performing working set and coverage analysis.

Using a profiler, a developer can determine: how many times a particular section of code is executed (i.e., function is called, loop is iterated, and the like) and how long does it take to execute a particular passage of code. A passage executed a million times during operation of a program deserves more attention than one executed only once or twice. Improvements in the former typically have a profound effect on overall program performance, while improvements in the latter probably would yield only marginal improvements.

Profilers typically employ one of two approaches for analyzing a program. In the first approach, the profiler periodically interrupts the program's operation and checks the current location of the program counter. The results are scored using statistical methodology. Although the approach is not difficult to implement, the results are not particularly good. For instance, sections of code which may be of interest might be too small to be sampled accurately. Also, the approach cannot tell reliably how many times a passage was employed. The second approach is to start a system timer when the program reaches a passage of interest and stop the timer when the program leaves the passage. The approach is harder to implement but generally leads to more accurate analysis of the program.

A particular disadvantage common to most code patching approaches is that a special version or "build" of the application being profile must be created—one with added code to monitor the calls of functions/subroutines in the software. Here, the typical approach employed is to use special compile options that produce extra function entry/exit function calls on entry and exit of a function. In addition to the additional calls, the approach requires a special executable link operation to bind in the function entry/exit function calls and the required runtime support for them. Using special builds of a software application that produce extra function entry/exit function calls is undesirable. Not only must extra steps must be performed by the developer, the resulting executable itself cannot be used for delivery to an end user, as it is too big and too slow for practical use. Further, the build may require extra analysis/monitoring code.

An alternative technique to creating a special build of an application is to apply "code patching" instead. On Intel platforms a relative 32-bit jump instruction requires five bytes in the machine code. With code patching, one copies the first five bytes of a function to a dynamically-allocated stub (additional bytes may have to be copied if an instruction crosses the first five bytes). The first five bytes are then replaced with a five-byte relative jump instruction to the begining of the stub. Another jump instruction is then placed at the end of the stub to jump back to this patched function preamble. This jump location is at the end of what is copied to the stub.

The approach is problematic, however. Many functions can have jump/loop instructions that jump into the first five bytes of a given function. One cannot guarantee that there exists at least five bytes of instruction at the begining of a function. Accordingly, a better technique is desired.

Code patching with a breakpoint instruction is another approach. In Intel-based systems, the breakpoint instruction is a one-byte instruction. As the approach is ideal for patching function entry points, it is often employed by software debuggers. Despite this advantage, a problem arises with program performance. A breakpoint execution causes a hardware exception that must be handled with a context switch. The overhead incurred can be substantial, particular when a tool is monitoring all the functions in an application.

Given the time pressures of modern-day software development, there is little room in one's development schedule for use of time-intensive profiling tools, particular ones which create applications which are unusable to end users. Yet given the potential performance benefits of optimized program code, there remains great interest in developing optimization techniques which do not incur a substantial time penalty in the development cycle and do not require creation of special program builds.

SUMMARY OF THE INVENTION

A development system having a monitor/profiler or analysis tool for monitoring functions in natively compiled software programs is described. According to the present invention, the monitor/profiler tool tool is constructed to work directly on a natively compiled software application which only have debugging info. Unlike prior approaches, the monitor/profiler tool does not require a special compile or link phase for the application under exam. The tool can monitor any function in software application which has debug info, thus relieving program developers from the burden of maintaining two ways of building an application. The developer can simply use the same executable for both development and function analysis.

The tool employs debugging info in the executable to provide full analysis of an application's functions calls. Debug info is typically present in executables under development because developers need to debug their applications. Since debugging info is usually appended to one end of a program's executable image, it can typically be quickly and safely removed from an executable without the need to recompile or relink the executable. Under ordinary circumstances, an executable with debug info executes identically to an the same executable after debug info has been removed.

A method is provided for intercepting all calls to all functions. The first problem overcome by the method is determining the names and address locations of all functions in an application. This information is found in two locations: (1) the import tables of shared libraries (e.g., Windows win32 dlls) are scanned to collect function name and address information, and (2) the debug info is used to collect all function name and address information of functions. For the former, functions imported from shared libraries are easy patched using conventional technique, since the import table itself can be patched directly. For the latter, the system maintains symbolic information it obtains sorted both by name and by address, thus allowing fast lookups by address or by name.

The next problem to overcome is how to intercept function calls that are discovered from an application's debug info. The system of the present invention intercepts all calls to a function by: 1) building a stub table that has a stub for each function, 2) scanning all of the addresses in the relocation tables of the executable image, and 3) disassembling all the code of the executable searching for relative call instructions. The stub serves as a destination for invoked functions. Specially, all references to a particular function are modified to call the stub instead of directly calling the associated function. The stub, in turn, calls an entry point into a monitoring tool and then jumps to the real code of the function being monitored. The system scans the relocation table to find addresses to functions. For each address in the relocation table, a binary search is performed on the table of known functions (discovered from debug info and sorted by address) to see if this is a function address that should be patched to call the stub. All of the executable's code is scanned for relative call instructions using a high speed code disassembler. If a relative call is found, the microprocessor instructions defining the call are also patched to call the stub.

In practice this approach has proved quite effective. Using high speed code disassemblers a large executable can be quickly scanned to discover all relative calls. The executables relocation tables can also be quickly scanned to find pointer references (e.g., C++virtual tables or "v-tables") to a function call. Exactly enough room always exists to do the patching. Relative calls are patched to make a relative call to the associated stub. Code pointer references found via the relocation tables are patched with the address of the associated stub. All told, the approach is yields high performance and is deterministic (i.e., one is assured that there is always enough room to perform the patch).

DETAILED DESCRIPTION OF A PREFERRED EMBODIMENT

The following description will focus on a preferred embodiment of the present invention which is operative in an Intel 80x86-compatible systems. The present invention, however, is not limited to any particular application or any particular environment. Instead, those skilled in the art will find that the system and methods of the present invention may be advantageously applied to a variety of platforms and environments. Therefore, the description of the exemplary embodiments which follows is for purposes of illustration and not limitation.

General Architecture

A. System Hardware

Figure 1A:
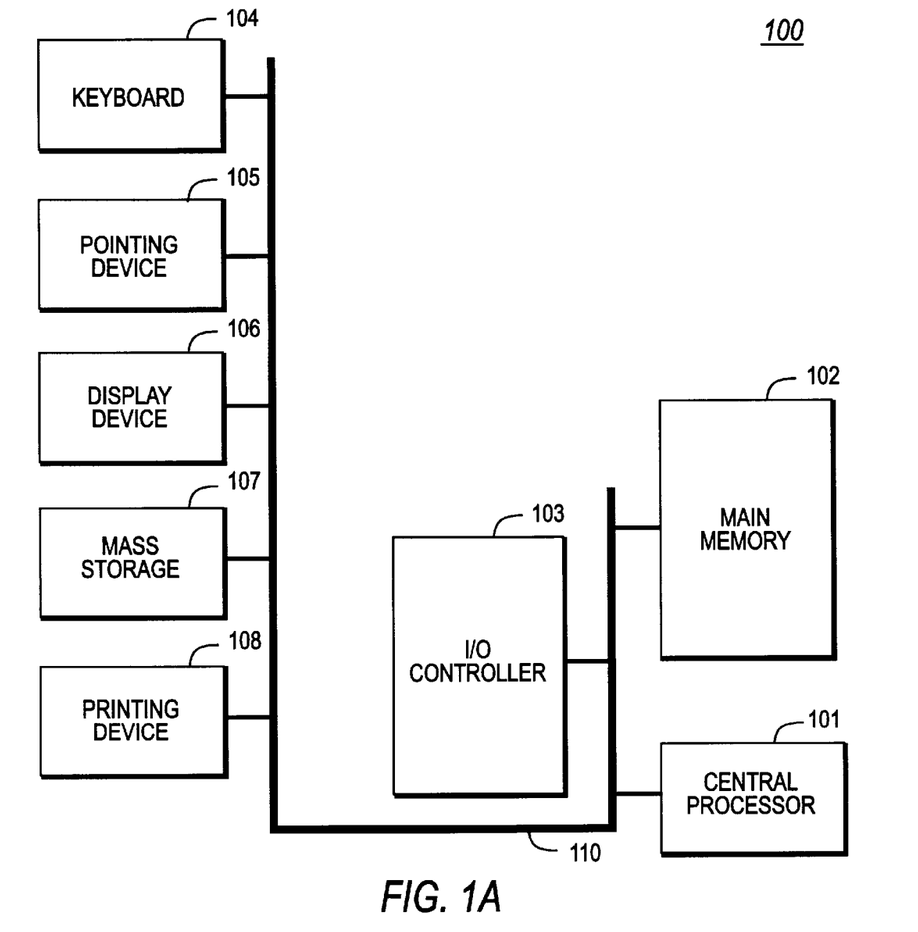
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Processor 101 includes or is coupled to a cache memory for storing frequently accessed information; cache memory may be an on-chip cache or external cache, as is known in the art. Additional input/output devices, such as a printing device 108, may be provided with the system 100 as desired. As shown, the various components of the system 100 communicate through a system bus 110 or similar architecture.

B. System Software

Figure 1B:
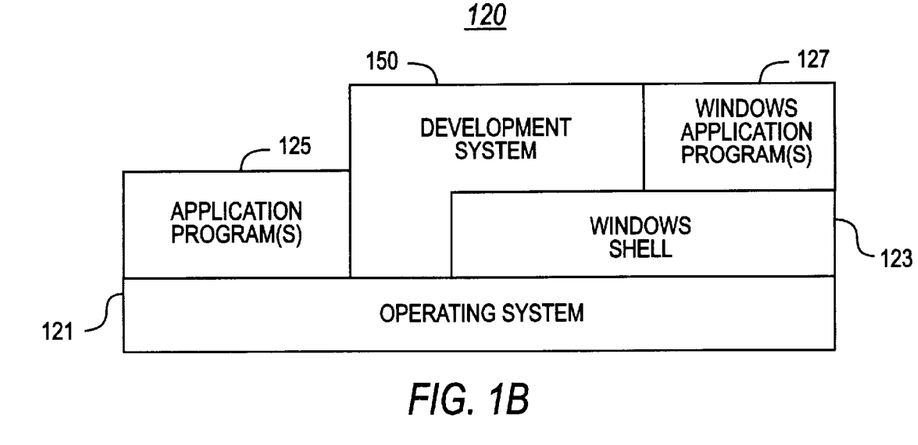
FIG. 1B is a block diagram of a software system for controlling the operation of the system of FIG. 1A.

Illustrated in FIG. 1 B, a computer software system 120 is provided for programming the operation of the computer system 100. Software system 120, which is stored in system memory 102 and/or on disk memory 107, includes a kernel or operating system (OS) 121 and a windows shell or interface 123. One or more application programs, such as application programs 125 or windows applications program (s) 127, may be "loaded" (i.e., transferred from storage 107 into memory 102) for execution by the system 100. OS 121 and shell 123, as well as application software 125, 127 include an interface for receiving user commands and data and displaying results and other useful information. Software system 120 also includes a development system 150 of the present invention for developing system and application programs. As shown, the development system 150 includes components which interface with the system 100 through windows shell 123, as well as components which interface directly through OS 121.

In a preferred embodiment, the system 100 includes an IBM-compatible personal computer, available from a variety of vendors (including IBM of Armonk, N.Y.). Operating system 121 is MS-DOS and shell 123 is Microsoft® Windows, both of which are available from Microsoft Corporation of Redmond, Wash. Alternatively, the system 100 may be implemented in other platforms, including Macintosh, UNIX, and the like. Development systems 150 include Borland® C++ Builder™, available from Borland International of Scotts Valley, Calif. Application software 125, 127, on the other hand, can be any one of a variety of application software, including word processing, database, spreadsheet, text editors, and the like.

C. Development System

Figure 1C:
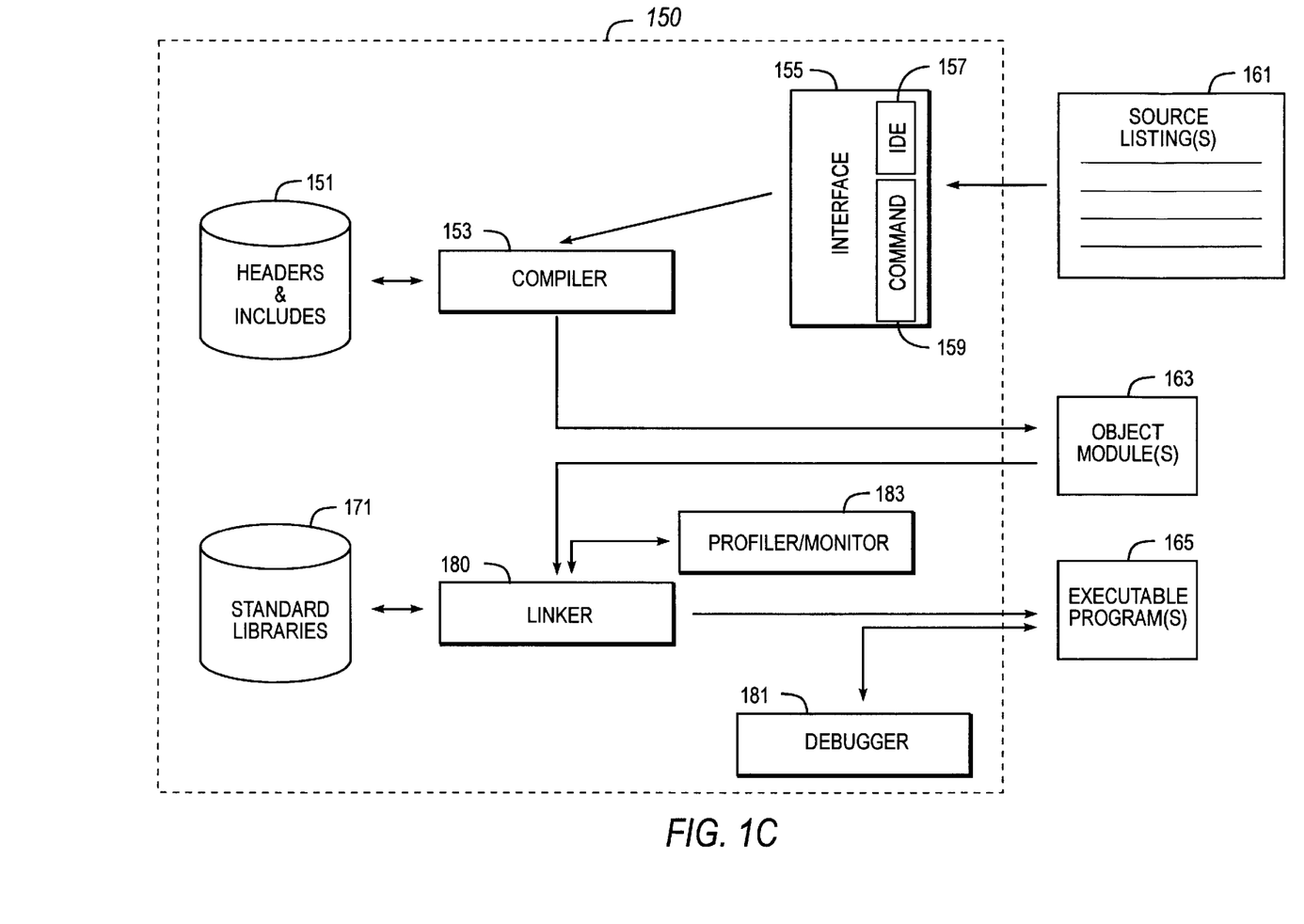
FIG. 1C is a block diagram of a development system of the present invention.

Shown in further detail in FIG. 1C, the development system 150 of the present invention includes a compiler 153, a linker 180, and an interface 155. Through the interface, the developer user supplies source modules 161 to the compiler 153. Interface 155 includes both command-line driven 159 and Integrated Development Environment (IDE) 157 interfaces, the former accepting user commands through command-line parameters, the latter providing menuing equivalents thereof. From the source code or listings 161 and headers/includes files 151, the compiler 153 "compiles" or generates object module(s) 163. In turn, linker 180 "links" or combines the object modules 163 with libraries 171 to generate program(s) 165, which may be executed by a target processor (e.g., processor 101 of FIG. 1 A). The standard libraries 171 include previously-compiled standard routines, such as graphics, I/O routines, startup code, math libraries and the like. The user developer may designate other libraries (e.g., custom libraries) whose code is to be linked into the target executable.

In a preferred embodiment, the compiler includes Borland C++ Builder compiler. A description of the general operation of development system 150 is provided with Borland® C++ Builder, available directly from Borland International. For a general introduction to the construction and operation of compilers, see Fischer et al., *Crafting a Compiler with C*, Benjamin/Cummings Publishing Company, Inc., 1991, the disclosure of which is hereby incorporated by reference.

A debugging module 181 is provided for tracking and eliminating errors in the programs 165. During compilation of a program, a developer user may specify that the program is to be compiled with "debug info." Debug info is used by the debugger 181 for tracking execution of the debuggee with the corresponding source listings. The general construction and operation of debuggers is well described in the technical, trade, and patent literature. See e.g., Pietrek, M., *Writing a Windows Debugger*, Windows/DOS Developer's Journal, pp. 6–12, June 1992. Particular user operation of the debugger 181 is described in *Borland C++: User Guide*, Chapter 6: Using the integrated debugger, Part No. BCP1240WW21770, Borland International, 1993. Formats for debug info are described in the technical literature; see e.g., *Borland Languages: Open Architecture Handbook*, Part No. 14MN-RCH01-10, Borland International, 1991.

As shown, the system 150 also includes a Monitor/Profiler tool 183 of the present invention. Before describing the construction and operation of the Monitor/Profiler tool 183, it is helpful to briefly review the relationship between coded procedures (functions or routines) set forth in one's initial source code and executable procedures as they reside in executable code modules. This relationship is perhaps best understood by tracing the genesis of a program from source code listings to object code modules, and then finally to an executable (binary) program image.

Genesis of an Executable Program

A. Object (OBJ) Modules

During creation of a program, individual translator outputs (i.e., outputs from compilers and assemblers) are linked together to create the executable program. The translator outputs or object modules ("OBJs") store a plurality of records describing the object language (e.g., Intel 80×86) used for input and output of object language processors, such as linkers and librarians. The basic layout of an 80×86 OBJ module and its records is defined by the Intel Object Module Format (OMF). The order of the records is to some extent arbitrary.

For a detailed discussion of the Object Module Format standard, including Microsoft's extensions, the reader should consult: (1) 8086 *Relocatable Object Module Formats*, Intel Corporation, 1981; (2) *Microsoft C Developer's Toolkit Reference*, Microsoft Corporation, 1990; and (3) *The MS-DOS Encyclopedia*, Microsoft Press, 1988. The disclosures of each of the foregoing are hereby incorporated by reference.

B. Sample source and object files

Figure 2A:
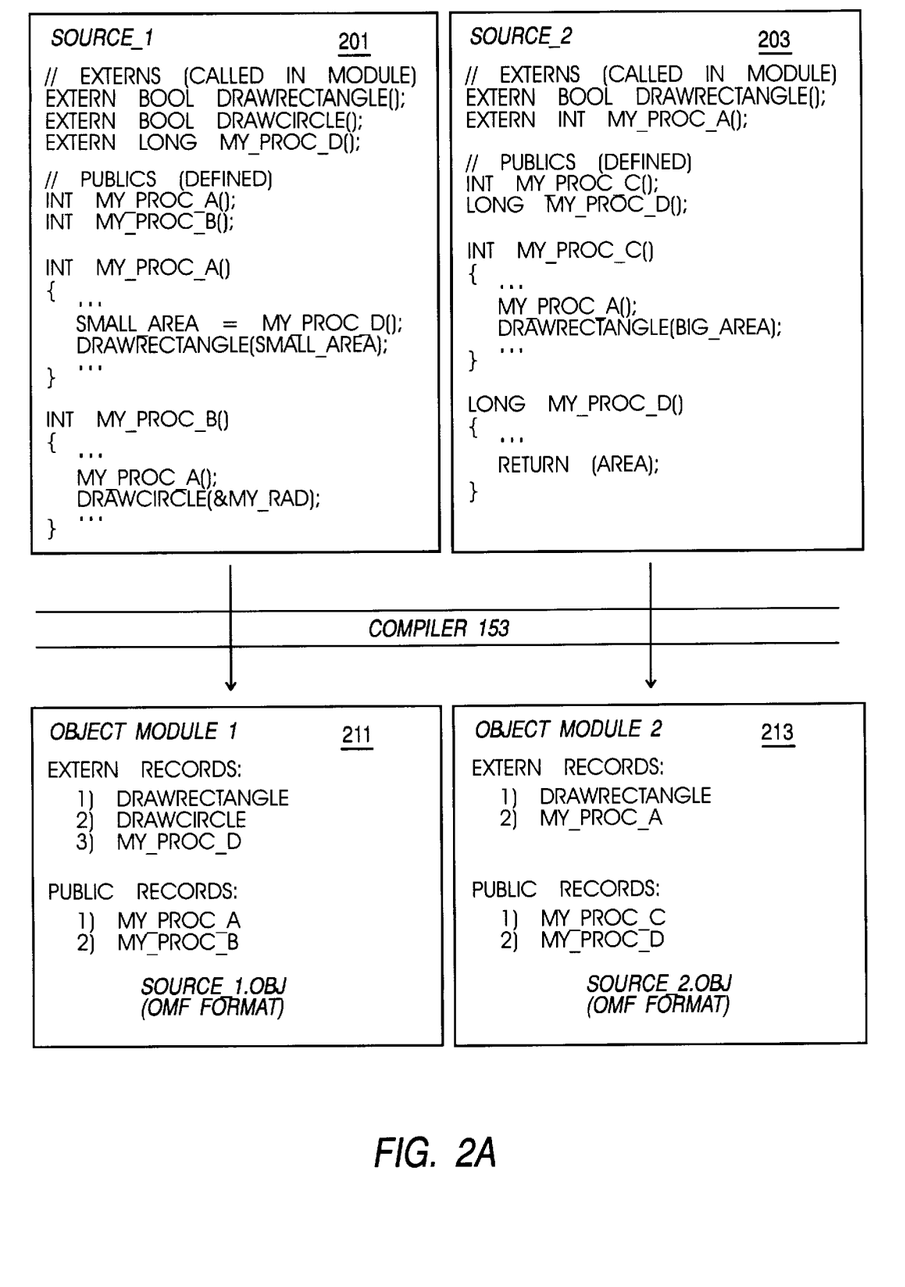
FIG. 2A is a block diagram illustrating the process (of the development system of FIG. 1C) for compiling source modules into object code (modules).
Figure 2B:
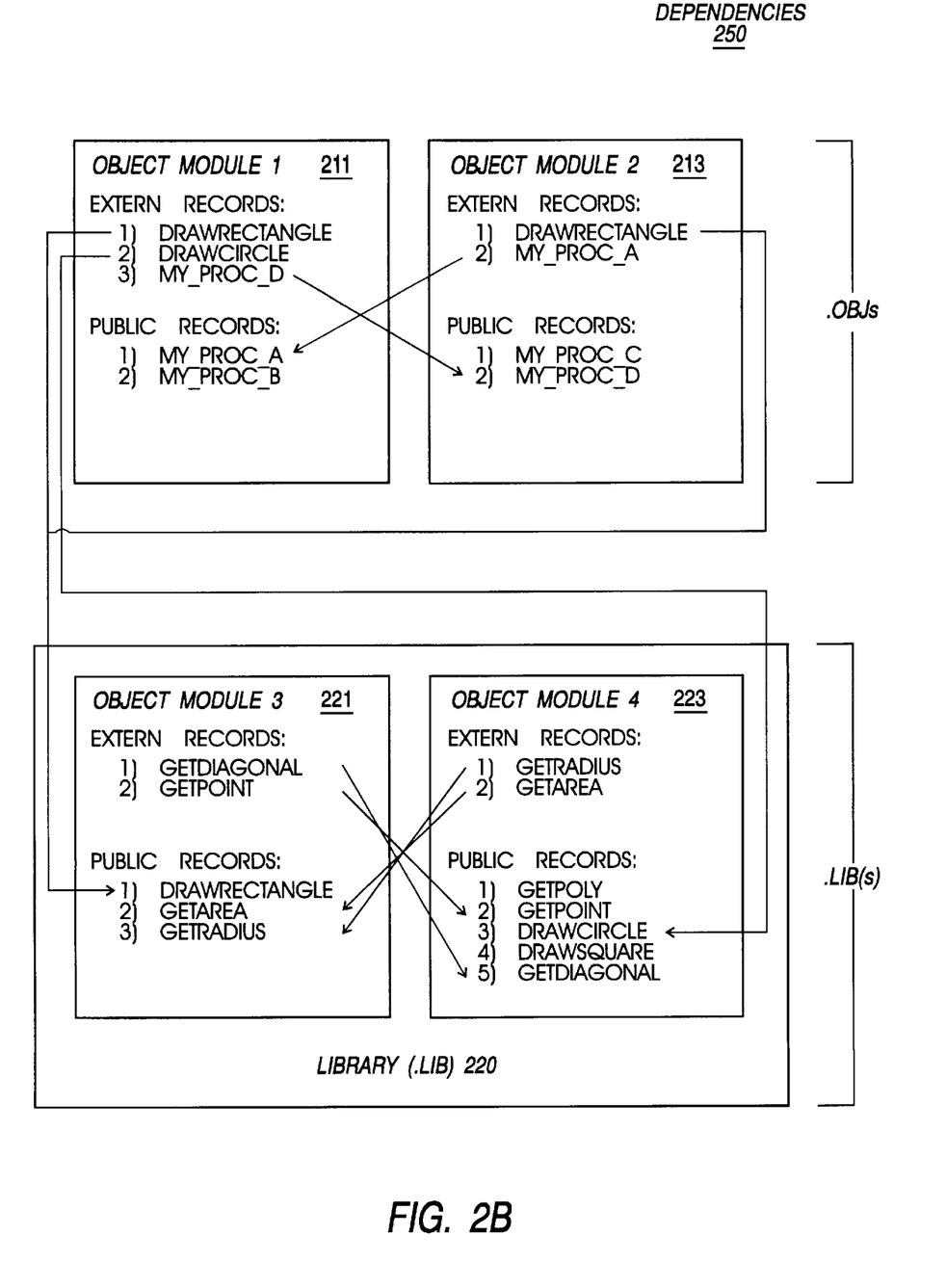
FIG. 2B is a block diagram illustrating various dependencies between procedures which may exist (among object modules and/or libraries).

The relationship between various source modules and their corresponding object modules is illustrated in FIGS. 2A–B. Source modules 201, 203 illustrate typical source code modules, such as would be supplied to the compiler 153 for generating modules of object code. Each module 201, 203 includes certain symbols which are "external" to the module and others which may be "public" to the module. In source 201, for instance, the routine $MY_{13}$ PROC_A is defined in that source module. As such, the routine is available for use globally (i.e., "public" visibility) within the source module 201.

Often, however, it is desirable to invoke routines which may be defined elsewhere (e.g., such as in a library file purchased from a third party vendor). As shown for the MY_PROC_A routine, for instance, a DRAWRECTANGLE routine is called. However, the DRAWRECTANGLE routine is defined elsewhere (i.e., the actual steps for the routine are set forth in a different module). Thus, the symbol "DRAWRECTANGLE" is "external" to the source module 201.

As shown by the object modules 211–213, the compiler 153 emits a particular (OMF) record for a symbol, based upon whether it is an external or public reference. As shown for the object module 211, for example, references to DRAWRECTANGLE, DRAWCIRCLE, and MY_PROC_D are stored in the object modules as external records. On the other hand, the two routines defined in source module 201—MY_PROC_A and MY_PROC_B—are stored as public records. The object module which source module 203 compiles into is also shown (as object module 213).

All told, there are dependencies between the various modules which exist. FIG. 2B illustrates dependencies 250 which may exist, for example, for the object modules 211, 213. Source module 201 generates object module 211. The module 211 includes three external references: 1) DRAWRECTANGLE, 2) DRAWCIRCLE, and 3) MY_PROC_D. The first two externals are satisfied by a library file 220, which itself is comprised of a plurality of object modules (e.g., object modules 221, 223). As is known in the art, a library essentially comprises a collection of object modules; an exemplary library format is that provided by Microsoft for MS-DOS (see e.g., *The MS-DOS Encyclopedia*, Microsoft Press, 1988). The third external reference (MY_PROC_D) is satisfied by the companion object module 213; that is, the module 213 includes a public record for MY_PROC_D which satisfies the corresponding external record for the object module 211. As shown by FIG. 2B, a multitude of interdependencies may exist, all of which must be satisfied during linking to create a valid executable program.

C. Emitting an Executable Image (Linking)

From the object file(s) and library file(s), an executable program may finally be generated. In general operation, a linker, such as linker 180, proceeds to scan the object module files desired to be included in the link operation. The linker also scans the object modules contained in any library files which have been specified to be included in the link. The linker gathers sufficient information to determine requirements for creating the executable, such as memory resources which are required by internal tables for the link operation.

After processing all of the object module files and library files, the linker determines which of the object modules contained in the library files are actually necessary to the link. A module is marked as "needed" if it contains one or more public records (e.g., OMF PUBDEF Records) that have been referenced via an external record (e.g., OMF EXTDEF Record) in another object module. The linker may then proceed to reprocess all of the object modules contained in the object files and any of the object modules contained in the library files but only for those which were marked as "needed." Any object modules in libraries that are not needed are skipped (i.e., not read into memory). As the object modules are processed, the executable image (Program 165 of FIG. 1 C) is constructed and emitted.

Figure 2C:
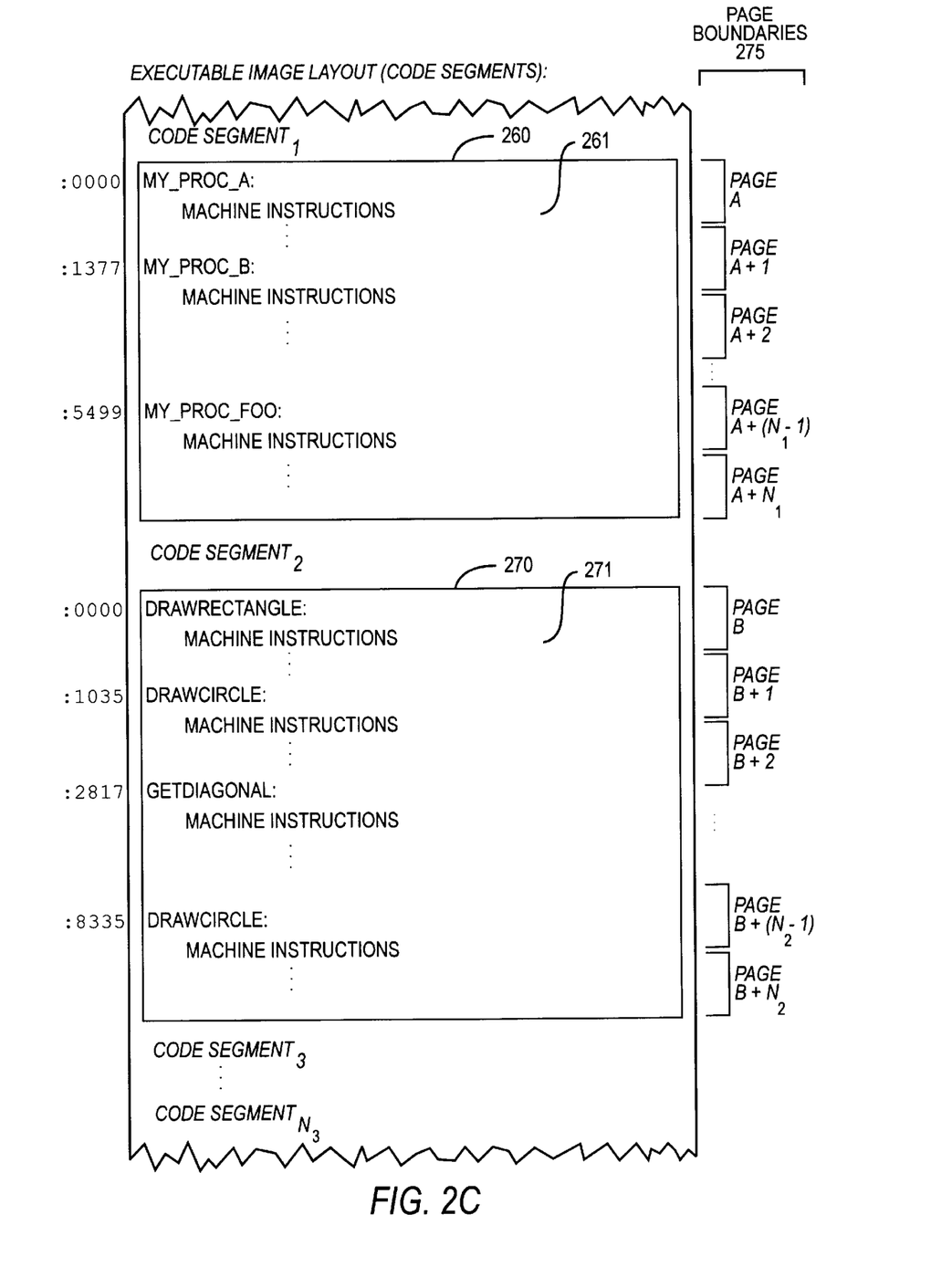
FIG. 2C is a block diagram illustrating typical placement of machine code for procedures in an executable program.

An executable image layout is illustrated in FIG. 2C. The binary image includes, among other things, one or more code segments for storing the machine instructions which define the particular procedures of the program. For instance, Code Segment$_1$, (260) includes the machine instructions for MY_PROC_A (261), beginning at offset 0000. MY_PROC_A is followed by MY_PROC_B at offset 1377; it, in turn, is followed by MY_PROC_FOO, beginning at offset 5499.

Code Segment$_1$ (260) may be followed by additional code segments, such as Code Segment$_2$ (270). In a manner similar to that described for Code Segment$_1$, Code Segment$_2$ comprises machine instructions for a plurality of procedures, such as the DRAWRECTANGLE procedure 271, which begins at offset 0000. Thus as shown by FIG. 2C, the routines from the object modules and/or libraries are ultimately placed in an executable program. It is the relative arrangement of the routines, with respect to one another, which impacts ultimate program performance and is therefore of particular interest to the present invention.

Also shown in FIG. 2C, the program code may be divided into a sequence of "pages" boundaries 275. To understand pages and page boundaries, it is helpful to first review generally how a computer system manages memory resources. In this manner, the methods of the present invention for optimizing placement of procedures within an executable program may be better understood.

Monitoring Functions in Natively Compiled Software Programs

A. General

According to the present invention, function monitoring tools should work directly on a natively compiled software application which only have debugging info; there is no need for a special compile or link phase. An analysis tool constructed in accordance with the present invention can monitor any function in software application which has debug info. This has a significant ease of use benefit to the developer because the developer does not have to maintain two ways of building the application and the developer uses the same executable for development and function analysis.

The present invention employs debugging information ("debug info") in the executable to provide full analysis of an application's functions calls. Debug info is typically present in executables under development because developers need to debug their applications. Since debugging info is usually appended to one end of a program's executable image, it can typically be quickly and safely removed from an executable without the need to recompile or relink the executable. Under ordinary circumstances, an executable with debug info executes identically to an the same executable after debug info has been removed.

B. Methodology for intercepting function calls

The invention provides a deterministic method of intercepting all calls to all functions. The first problem overcome by the method is determining the names and address locations of all functions in an application. This information is found in two locations: (1) the import tables of shared libraries (e.g., Windows win32 dlls) are scanned to collect function name and address information, and (2) the debug info is used to collect all function name and address information of functions. For the former, functions imported from shared libraries are easy patched using conventional technique, since the import table itself can be patched directly. For the latter, the system maintains symbolic information it obtains sorted both by name and by address, thus allowing fast lookups by address or by name.

The next problem to overcome is how to intercept function calls that are discovered from an application's debug info. The system of the present invention intercepts all calls to a function by: 1) building a stub table that has a stub for each function, 2) scanning all of the addresses in the relocation tables of the executable image, and 3) disassembling all the code of the executable searching for relative call instructions. The stub serves as a destination for invoked functions. Specially, all refereneces to a particular function are modified to call the stub instead of directly calling the associated function. The stub, in turn, calls an entry point into a monitoring tool and then jumps to the real code of the function being monitored. The system scans the relocation table to find addresses to functions. For each address in the relocation table, a binary search is performed on the table of known functions (discovered from debug info and sorted by address) to see if this is a function address that should be patched to call the stub. All of the executable's code is scanned for relative call instructions using a high speed code disassembler. If a relative call is found, the microprocessor instructions defining the call are also patched to call the stub.

C. Detailed method steps

Figure 3:
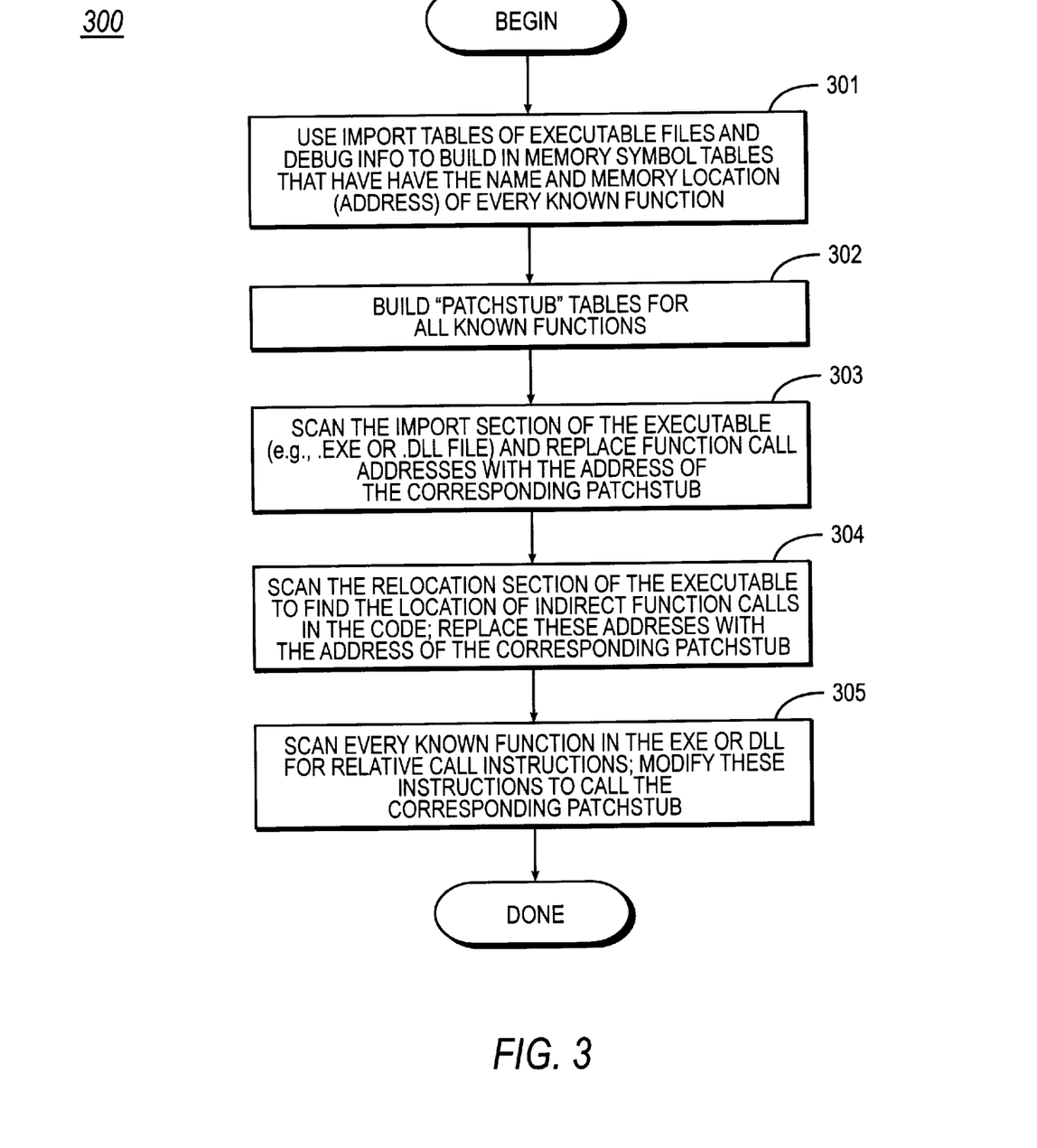
FIG. 3 is a flowchart illustrating method steps of the present invention for monitoring functions in natively compiled software programs without the need to recompile programs.

FIG. 3 illustrates a method 300 for monitoring functions in natively compiled software programs without the need to recompile programs. As shown at step 301, the method uses import tables of executable files (e.g., .exe or .dll files) and any debug info that may be present to build in-memory symbol tables that have have the name and memory location (address) of every known function. This information is sorted by address and by name, thus allowing fast binary searching by address or by name.

Exemplary program logic for getting import information may be constructed as follows.

```
while (ThunkAddrs—>u1.Function)
    {
    sName    =    GetImportName(  sNameBuf, baseAddress,
                                  ThunkNames, ExportBase
                                );
    FuncAddr  =  CODEADDR (ThunkAddrs—>u1.Function);
//Log.Out("Import %s %x", sName, FuncAddr);
        if (   strncmp((char*)sName, "_setjmp", 7)   ==0
            || strncmp((char*)sName, "setjmp", 6)    ==0)
        {
            Log.Out("Skipping setjmp");
        }
        else
        // Test to see if it points into code section of dll.
        // could be importing data.
        //
        if (      (iAccume = FindFunction(iEntry, FuncAddr)) > -1
              && !ProfData.IgnoreList.HasName(sName))
            {
            AccumeStub    =    AccumeStubs + iAccume;
            PatchStart    =    PatchBuf;
            *PatchBuf             =    0x68; // push accume addr.
//Log.Out("Found Function %d", iAccume);
            ++PatchBuf;
            *((long*)PatchBuf)    =    long (AccumeStub);
            PatchBuf              +=   4;
            // call relative to PROFENTRY
            //
            *PatchBuf             =    0xE8;
            ++PatchBuf;
            *((long*)PatchBuf)
                  =    ComputeRelative( PatchBuf+4, NOPROF_PROFENTRY );
            PatchBuf              +=   4;
            AccumeStub—>Flags    |=   (char)aState;
            // jmp relative added to keep
            // timing overhead consistent with
            // regular function patches.
            *PatchBuf             =    0xE9;
            ++PatchBuf;
            *((long*)PatchBuf)
                  = ComputeRelative( PatchBuf+4,PatchBuf+4 );
            PatchBuf              +=   4;
```

-continued

```
        // Now jmp indirect to
        *PatchBuf           =   0xFF;
        ++PatchBuf;
        *PatchBuf           =   0x25;
        ++PatchBuf;
        *((long*)PatchBuf)  =   (long) (PatchBuf+4);
        PatchBuf            +=  4;
        *((long*)PatchBuf)  =   long(FuncAddr);
        PatchBuf            +=  4;
//Log.Out("About to hook");
        // Now hook it baby, babe, man - what ever.
        //
        ThunkAddrs—>u1.Function =   PDWORD(PatchStart);
//Log.Out("hook done");
        }
    else
        {
        Log.Out("Skipping %s import.
                   Its not in the code section",
                sName
                );
        Log.Out(   "%1d not in %1d %1d",
                   ThunkAddrs—>u1.Function,
                   iEntry—>LowAddr , iEntry—>HighAddr
                );
        }
    ++ThunkAddrs;
    ++ThunkNames;
    ASSERT((PatchBuf - iEntry—>PatchBuf)
        <= iEntry—>nPatchBytes);
    }
```

At step 302, the method builds "Patch Stub" tables (PatchStub) for all known functions. These are fragments of executable code that all calls to known functions will be patched to call (instead of the actual function). This allows a monitoring tool, such as a profiler, to record the call and its return address before it jumps to the location of the actual function that needs to be called. The return address is saved off from the CPU stack to a parallel stack. The return address on the CPU stack is then modified to store a return addres that calls a function in the monitoring tool. This provides the monitoring tool a notification of when the monitored function is complete. The monitoring tool takes note of time spent in the function and then replaces the correct address on the stack and performs a return instruction so the application may resume execution.

In an exemplary embodiment, a C "struct" (C programming language structure) for the PatchStub data structure may be constructed as follows.

```
        struct   PatchStub
        {
            char    PushInst;
            LONG    PushVal;
            char    CallInst;
            LONG    CallAddr;
            char    JmpInst;
            LONG    JmpAddr;
        };
```

Exemplary program logic for initializing the Stub may be constructed as follows.

```
// push op code for Accume address.
Patch—>PushInst = 0x68;
Patch—>PushVal      =   long(AccumeStub);   // Accume address.
// call relative to NOPROF_PROFENTRY
// call into
//
Patch—>CallAddr
    = ComputeRelative( &Patch—>CallAddr + 1,
                        NOPROF_PROFENTRY );
function_being_patched—>JmpAddr
    ComputeRelative(   &Patch—>JmpAddr + 1,
                        FuncTable—>FuncAddress );
```

At step 303, the method scans the import section of the executable (e.g., .exe or .dll file) and replaces function call addresses with the address of the corresponding PatchStub. Now, at step 304, the method scans the relocation section of the executable to find the location of indirect function calls in the code. These addreses (i.e., from a conventional virtual table or "v-table" entry or function pointer) are replaced with the address of the corresponding PatchStub. Exemplary program logic for scanning all relocation entries for address that refer to a known function may be constructed as follows.

```
while (pReloc—>VirtualAddress
        && pReloc—>SizeOfBlock >
            sizeof(*pReloc))
    {
    pTypeOff    =   (WORD*) (pReloc+1);
    nOffsets    =   (pReloc—>SizeOfBlock - sizeof(*pReloc))
                    / sizeof(WORD);
    pBlock      =   (ULONG*)MakePtr(baseAddress,
                    pReloc—>VirtualAddress);
    for (iOffset = 0; iOffset < nOffsets; ++iOffset)
        {
        if ((*pTypeOff & 0xF000) == 0x3000)
            {
            pEntry  = (ULONG*) (((char*)pBlock)
                        + (*pTypeOff&0xFFF));
            // If known address, modify it to point to the PatchStub
            //
            if ((iFunc=FindFunction(mEntry, CODEADDR(*pEntry))) >= 0)
                {
                *pEntry =   ULONG(PatchTable+iFunc);
                }
            }
        ++pTypeOff;
        }
    pReloc      =   (PIMAGE_BASE_RELOCATION)pTypeOff;
    }
```

At step 305, the method scans every known function in the .exe or .dll for relative call instructions. Modify these instructions to call the corresponding PatchStub. Exemplary program logic for implementing the scanning of all the known functions and patching the relative calls may be constructed as follows.

```
nFuncs =    mEntry—>nFuncs;
for (iFunc = 0; iFunc < nFuncs; ++iFunc)
    {
    // Special handling for function that pops the stack
    // at the end of handling
    //
    if (FuncTable—>FuncSize == PATCHJUMPTOCATCH)
        {
        Log.Out("Patching caller __JumpToCatch__ in %s",
            mEntry—>sDebugName);
        PatchJumpToCatch((UCHAR*)FuncTable—>FuncAddress);
        }
    else
    if (ProfDataFile::IsACodeAddr(mEntry, FuncTable—>FuncAddress))
        {
        if (iFunc < (nFuncs-1))
            EndAddr =   (FuncTable+1)—>FuncAddress;
        else
            EndAddr =   0;
        // bWinMain = stricmp(ProfData.GetFuncNameByFunc(mEntry,
iFunc), "winmain") == 0;
        // Initialize code disassembler for disassembling
        // this function.
        //
        disAsm.Init(FuncTable—>FuncAddress, EndAddr);
        for(;(pCaller = disAsm.FindCall( )) != NULL;)
            {
            pOffset =   (long*) (pCaller+1);
            addr    =   pCaller + *pOffset + 5;
            // Relative function call found, see if its in symbol table
            // sorted by address (FindFunction performs binary search).
            //
            if ((iAccume = FindFunction(mEntry, addr)) >= 0)
                {
                ASSERT(iAccume < mEntry—>nFuncs);
                *pOffset
                    = ComputeRelative( pCaller+4, PatchTable+iAccume);
                }
            }
```

-continued

```
        }
    else
        Log.Out(    "Call %8x %s not in mod %s",
            FuncTable—>FuncAddress,
            ProfData.GetFuncNameByFunc(mEntry, iFunc),
            mEntry—>sDebugName
            );
    ++FuncTable;
    }
```

Note that finding a corresponding function is efficient because there is an in-memory symbol table that can be binary searched by an address value.

D. Advantages

In practice the approach of the present invention has proved quite effective. Using high speed code disassemblers a large executable can be quickly scanned to discover all relative calls. The executables relocation tables can also be quickly scanned to find pointer references (e.g., C++ virtual tables or "v-tables") to a function call. Exactly enough room always exists to do the patching. Relative calls are patched to make a relative call to the associated stub. Code pointer references found via the relocation tables are patched with the address of the associated stub. All told, the approach is retains high program performance and is deterministic (i.e., one is assured that there is always enough room to perform the desired patch).

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, wherein each stub in turn calls an entry point into a monitoring routine for monitoring the function associated with the stub.

2. The method of claim 1, wherein each stub includes a jump instruction for returning control back to the function associated with the stub.

3. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, wherein said scanning step includes:

performing a binary search on known functions sorted by function address to determine function addresses that should be patched to call stubs.

4. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, wherein said scanning step includes:

disassembling all code of the particular program for determining each call instruction to a function which is to be monitored, whereupon microprocessor instructions defining each such call are patched to call the stub associated with the function.

5. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, wherein said debugging information includes symbolic information indicating names addresses for functions.

6. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, wherein at least one stub invokes a monitoring routine for analyzing the function associated with the stub.

7. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, further comprising:

stripping debugging information from the particular program when no further monitoring is desired.

8. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, wherein said step of determining names and address locations of functions includes:

sorting name and address location information both by name and by address, for allowing fast lookups by name or by address.

9. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, wherein said step of scanning the particular program for replacing each call instruction to a function being monitored includes:

scanning all addresses present in relocation tables of the particular program; and disassembling all code of the particular program, for searching for relative call instructions.

10. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, wherein at least one stub invokes a profiler, for recording invocation of the function associated with the stub prior to actual execution of the function.

11. In a software development system for developing software programs, a method for monitoring functions in natively-compiled software programs, the method comprising:

receiving a request to monitor functions of a particular program which has been compiled with debugging information;

determining names and address locations of functions to be monitored in the particular program;

building a stub table that has a stub associated with each function to be monitored; and scanning the particular program for replacing each call instruction to a function being monitored with a call instruction to a stub associated with the function, so that all calls to a particular function to be monitored are modified to call the stub instead of directly calling the particular function, wherein a return address is saved during program execution for each function call which is invoking an associated stub.

12. The method of claim 11, wherein said return address is saved on a parallel stack.

* * * * *